United States Patent [19]
Giffen et al.

[11] 4,040,645
[45] Aug. 9, 1977

[54] SEAT-BELT APPARATUS

[75] Inventors: William McAlpin Giffen, Hailey, England; John Michael Pollitt, Gretna, Scotland; Roy Clifford, Carlisle, England

[73] Assignee: Auto Restraint Systems Limited, London, England

[21] Appl. No.: 585,426

[22] Filed: June 9, 1975

[30] Foreign Application Priority Data

June 10, 1974 United Kingdom ............... 25703/74

[51] Int. Cl.² .............................................. B60R 21/10
[52] U.S. Cl. ............................ 280/745; 242/107.4 A; 280/747; 297/388; 297/389
[58] Field of Search ................. 280/150 SB, 744, 745, 280/747; 180/82 C; 297/388, 389; 242/107.4 A

[56] References Cited
U.S. PATENT DOCUMENTS

| 3,727,943 | 4/1973 | Augunas et al. ............... 280/150 SB |
| 3,764,161 | 10/1973 | Bright et al. .................... 280/150 SB |
| 3,771,814 | 11/1973 | Hahn .............................. 280/150 SB |
| 3,797,603 | 3/1974 | Loomba ....................... 280/150 SB X |
| 3,831,702 | 8/1974 | Kaneko et al. ............. 280/150 SB X |
| 3,845,836 | 11/1974 | Bendler et al. ..................... 180/82 C |
| 3,865,397 | 2/1974 | Pilhall et al. .................... 280/150 SB |
| 3,866,944 | 2/1975 | Takahashi ...................... 280/150 SB |

Primary Examiner—Joseph E. Peters, Jr.
Assistant Examiner—Michael J. Forman
Attorney, Agent, or Firm—Pollock, Vande Sande & Priddy

[57] ABSTRACT

A seat-belt apparatus of the kind which is arranged to be mounted in a vehicle for automatically moving a seat-belt of the apparatus into, and away from, an operative position across a vehicle seat. A seat-belt retraction mechanism is coupled to the seat-belt and is mounted on a vehicle door adjacent the said seat. The retraction mechanism includes a locking mechanism for inhibiting withdrawal of the seat-belt from the retraction mechanism, and is provided with means for controlling operation of the locking mechanism having a first state in which operation of the locking mechanism is inhibited and a second state in which operation of the locking mechanism is permitted. The means for controlling operation of the locking mechanism may be arranged to inhibit operation of the locking mechanism at least when the door is being opened and to permit operation of the locking mechanism at least when the vehicle is in motion, and, in these circumstances, the means for controlling operation of the locking mechanism may include means responsive to the position of the door to inhibit operation of the locking mechanism whenever the door is open and to permit operation of the locking mechanism whenever the door is closed.

8 Claims, 7 Drawing Figures

DIRECTION OF DOOR OPENING.

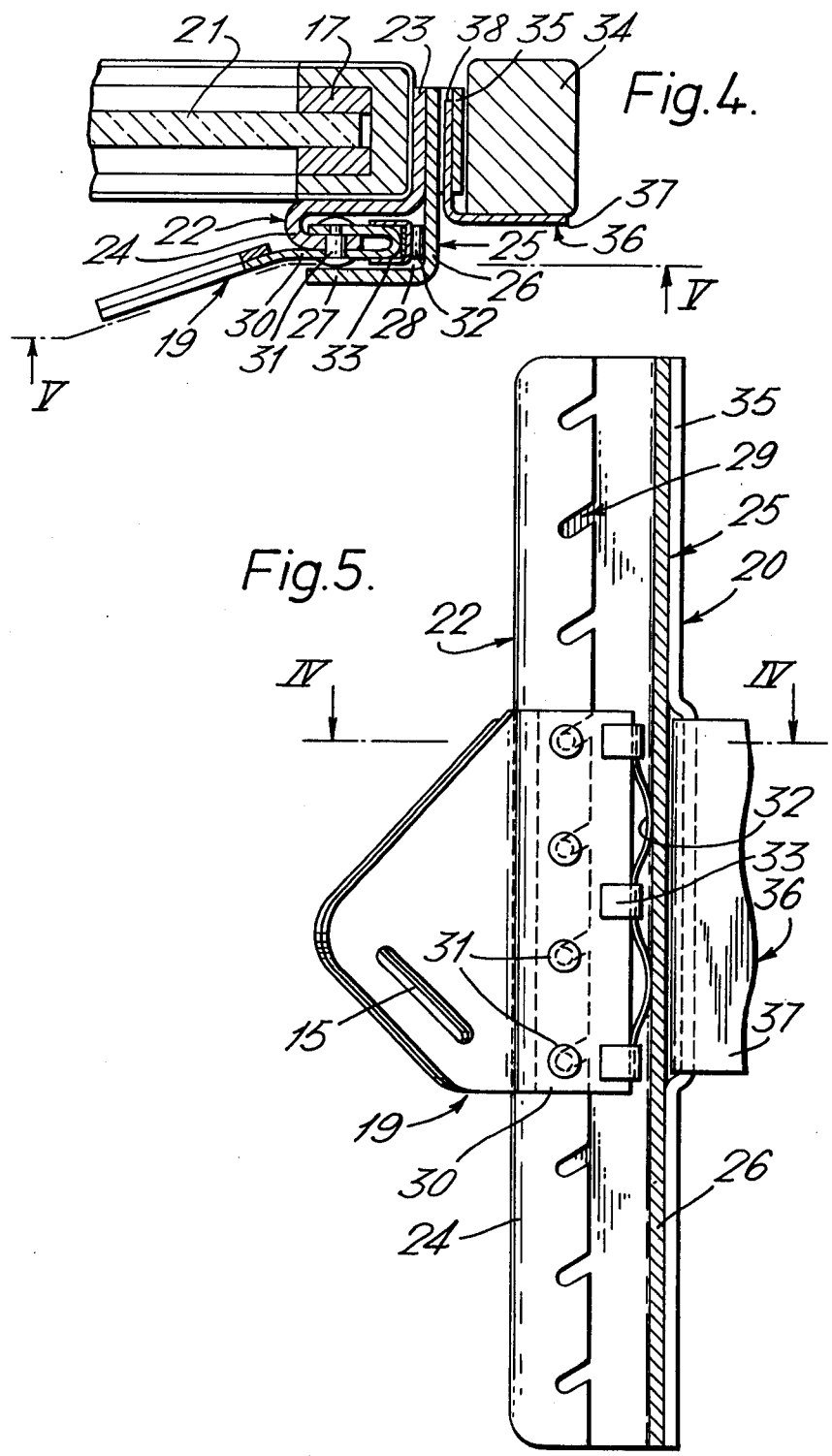

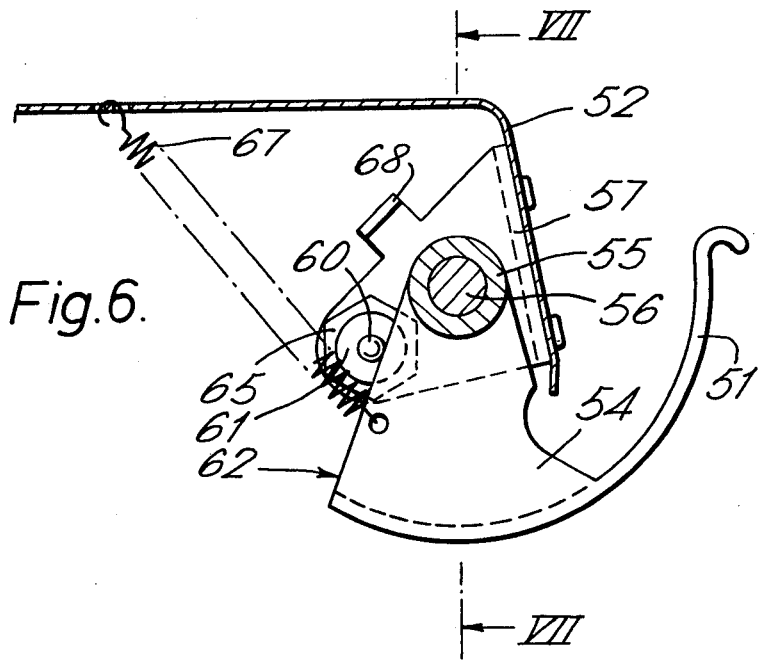
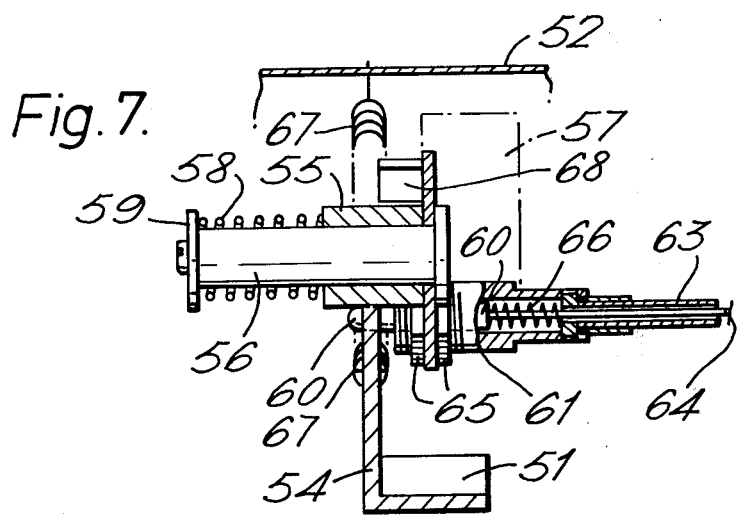

SEAT-BELT APPARATUS

This invention relates to seat-belt apparatus and, more particularly, to seat-belt apparatus of the kind which is arranged automatically to move the seat-belt into, and away from, an operative position across a vehicle seat. By 'operative position' is meant a position of the seat-belt in which the seat-belt is capable of embracing a seat occupant to restrain the seat occupant against movement. Such a seat-belt apparatus will hereinafter be referred to as a 'seat-belt apparatus of the kind specified.'

According to one aspect of the present invention there is provided a seat-belt apparatus of the kind specified comprising a seat-belt retraction mechanism which is to be mounted on a vehicle door adjacent the said seat and which is to be coupled to the seat-belt, the retraction mechanism including a locking mechanism for inhibiting withdrawal of the seat-belt from the retraction mechanism, and means for controlling operation of the locking mechanism having a first state in which operation of the locking mechanism is inhibited and a second state in which operation of the locking mechanism is permitted.

Preferably the said means is arranged to inhibit operation of the locking mechanism at least when the said door is being opened and to permit operation of the locking mechanism at least when the vehicle is in motion.

The said means may be arranged to respond to the position of the said door to adopt its said first state whenever the door is open and to adopt its said second state whenever the door is closed.

The said means may be movable between a first position in which operation of the locking mechanism is inhibited and a second position in which operation of the locking mechanism is permitted.

The locking mechanism may include an actuating arm, (for example, a pawl of a pawl and ratchet locking mechanism) and the said means may comprise a lever, resilient means for urging the lever into a position where it restrains movement of the actuating arm to inhibit operation of the locking mechansim, and means which is arranged to move the lever against the action of the resilient means into a position where movement of the arm to initiate operation of the locking mechanism is permitted. In these circumstances the said means for moving the lever may comprise an elongate member which is to be slidably mounted on the said door and which is to be coupled to the lever, and a device which is to be mounted on a fixed structure of the vehicle and which is to engage the elongate member whenever the door is closed to move the lever into the said position where operation of the locking mechanism is permitted.

The locking mechanism may be an inertia operable locking mechanism which, when its operation is permitted, is arranged to prevent withdrawal of the seat-belt from the retraction mechanism in the event of the locking mechanism being subjected to a deceleration in excess of a predetermined magnitude.

The seat-belt apparatus may include a support which is to be disposed at a location forwardly of the said seat to provide a support for the seat-belt whenever it is displaced from its said operative position.

According to a further aspect of the present invention there is provided a vehicle including a seat-belt apparaus as aforesaid.

One form of seat-belt apparatus in accordance with the present invention will now be described, by way of example, with reference to the accompanying drawings in which:

FIG. 4 is a sectional view of an anchorage for the seat-belt on the line IV—IV of FIG. 5 mounted on a door frame of the automobile;

FIG. 5 is a sectional view of the anchorage on the line V—V of FIG. 4;

FIG. 6 is a fragmentary sectional view showing a support for the seat-belt when displaced from its operative position across the seat; and FIG. 7 is a sectional view on the line VII—VII of FIG. 6.

Figure 1:
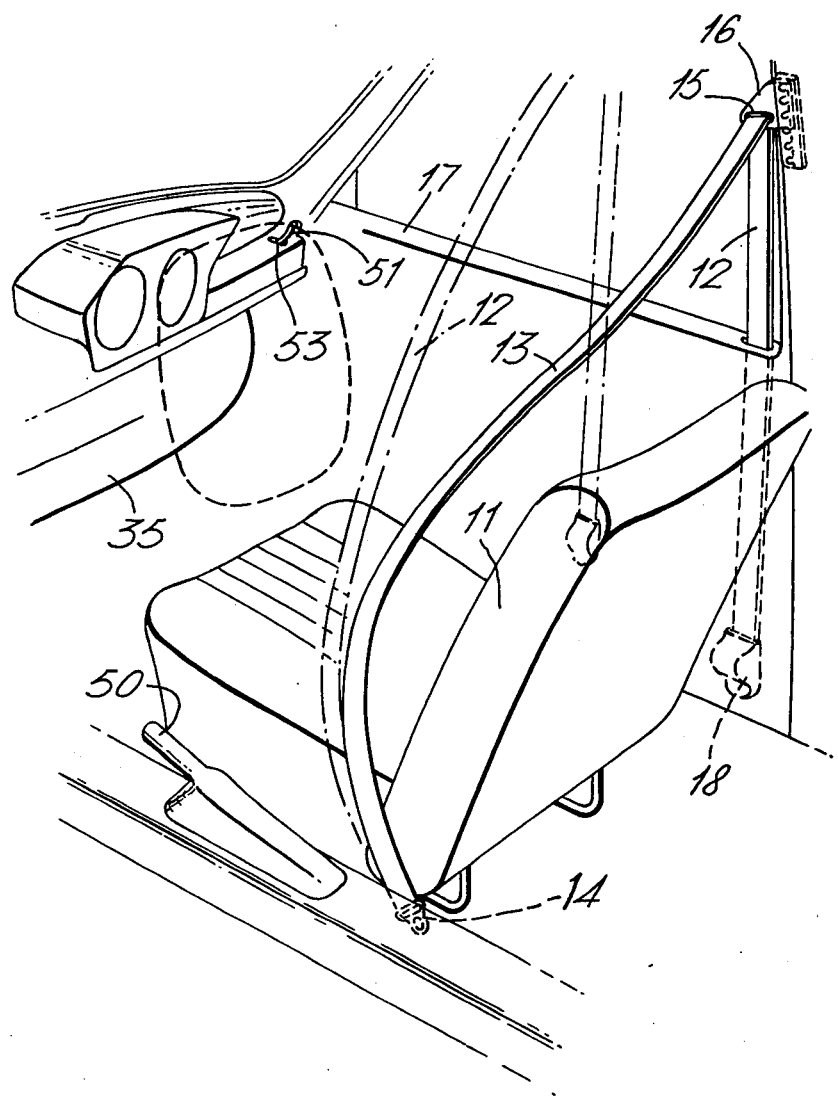
FIG. 1 is a diagrammatic view of an automobile incorporating the seat-belt apparatus.
Figure 2:
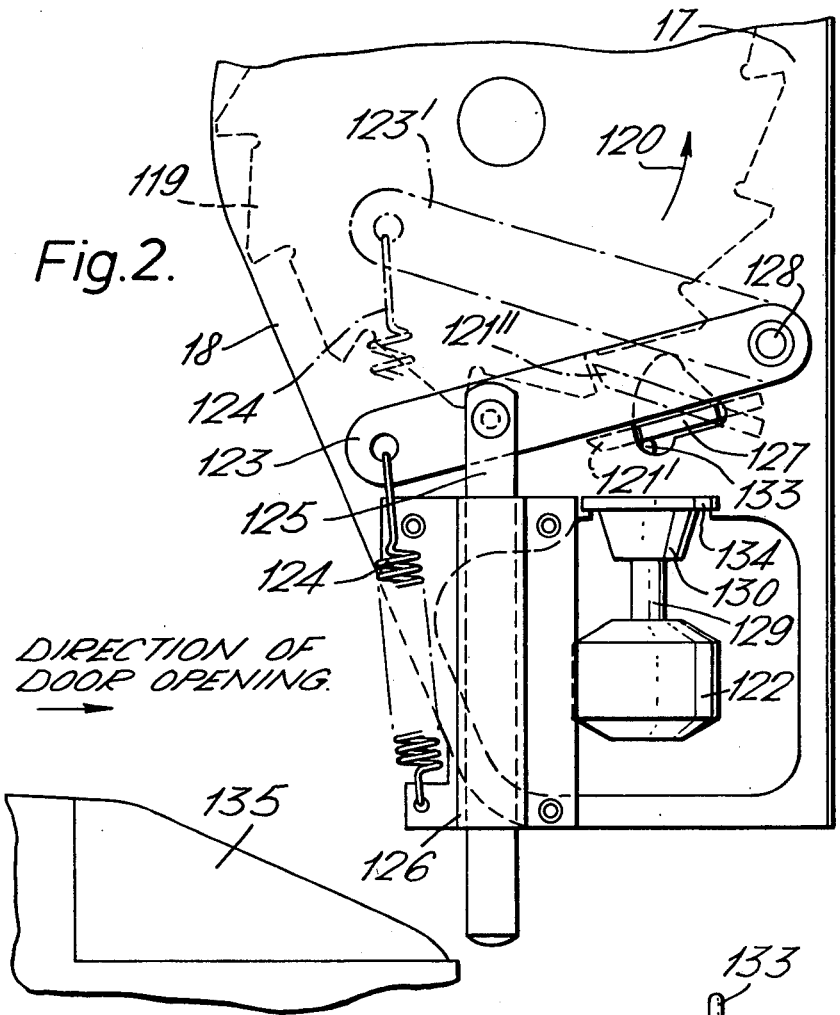
FIG. 2 is a fragmentary view showing in more detail a seat-belt retraction mechanism of the apparatus mounted on an automobile door and means for inhibiting locking of the retraction mechanism when the door is open.
Figure 3:
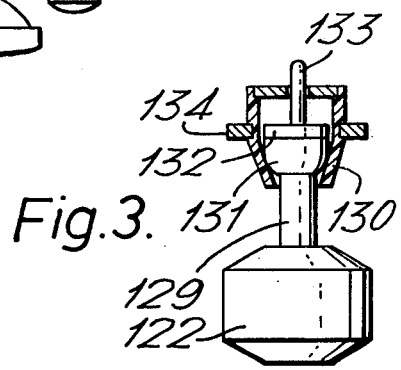
FIG. 3 is a sectional side view showing in more detail a part of the seat-belt retraction mechanism of FIG. 2.

Referring to FIGS. 1 to 3, an automobile (FIG. 1) has a driver's seat 11 and an automatically embracing seat-belt 12 for the seat 11. A similar seat-belt (not shown) is provided for the other front seat of the automobile. The seat-belt 12 is shown in full lines in its operative position, that is, its seat-occupant embracing position, and in dashed lines in the inoperative position it normally adopts when displaced to permit a person to enter and leave the seat.

The seat-belt 12 comprises a single strap 13 which is secured at one end to an anchorage 14 mounted on the vehicle floor between the front seats of the automobile and adjacent the back thereof. The straps 13 pass freely through a slot 15 formed in an upper anchorage 16 mounted on the rear edge of a door 17 and on into a housing 18 mounted within the door at the bottom thereof adjacent its rear edge. This housing contains a spring-loaded reel (not shown) on which the respective end of the strap 13 is wound, the spring acting against withdrawal of the strap 13 from the housing 18 to provide automatic retraction of the strap into the housing and to maintain the strap under tension at least when it embraces a seat occupant. Thus when the door 17 is opened, the strap 13 is automatically unwound from the spring-loaded reel and the seat-belt 12 is moved from its operative position to its inoperative position. By mounting the spring-loaded reel on the door 17 rather than on the anchorage 14, the seat-belt will not move across the seat occupant when the door is opened and closed or when the occupant moves forward in the seat 11. This reduces considerably the wear to the seat-occupant's clothing caused by the seat-belt 12. A padded knee restraint for the seat occupant is shown at 35.

The height of the upper anchorage on the door 17 is adjustable to enable the height of that anchorage to be adjusted to suit the height of the seat occupant. Such a seat-belt anchorage is shown in FIGS. 4 and 5, and includes a support 19 in which the slot 15 for the seat-belt is provided, and a mounting 20 for the support 19 mounted on a portion of the door frame 17 bounding the rear edge of a window 21. The mounting 20 includes an elongate strip 22 of mild steel which is generally right-angled in cross-section and which comprises limbs 23 and 24, and an elongate strip 25 of mild steel which is right angled in cross-section and which comprises limbs 26 and 27. The mounting 20 is secured to the door frame 17 be spot welding the limbs 23 and 24 of the strip 22 to, respectively, the edge and the inner surface of the door frame 17, and by spot welding the limb 26 of the strip 25 to the limb 23 to provide, between the limbs 24 and 27, a space 28 constituting a vertical guideway in which the support 19 is slidably mounted. The free end of the limb 24 is hooked over to extend into the guideway 28 parallel to the limb 27 and includes a plurality of downwardly-inclined, equally-spaced slots 29 formed in its longitudinal edge.

The support 19 includes a part 30 of U-shaped configuration which is disposed within the guideway 28 with the limbs of the U-shaped part 30 bounding opposite sides of the free end of the limb 24. A plurality of rivets 31 extend between the limbs of the U-shaped part 30, the rivets 31 being spaced apart longitudinally of the part 30 by a distance equal to the spacing between the slots 29. The rivets 31 are shaped to cooperate with the slots 29 and are urged into engagement therewith by a spring 32 disposed between the U-shaped part 30 and the limb 26. The spring 32 is provided by a strip of resilient metal and is secured to the U-shaped part 30 by metal clips 33 disposed at spaced locations along the length of the part 30, the lengths of the spring 32 between each adjacent pair of the clips 33 being bowed outwardly from the U-shaped part 30 resiliently to engage the limb 26.

In order to adjust the height of the support 19 to suit the height of the seat occupant, the support 19 is firstly urged to the right in FIGS. 4 and 5 to compress the spring 32 and disengage the rivets 31 from the slots 29. Thereafter, the support 19 is slid along the guideway 28 in the desired vertical direction to a position in which the rivets 31 are in alignment with appropriate ones of the slots 29 so that upon releasing the support 19 the rivets 31 are urged by the spring 32 into engagement with these slots 29.

If the vehicle is involved in a crash, a considerable force may be exerted on the anchorage and hence on the door frame 17, and it is visualised that in these circumstances the door frame 17 may be unable to withstand this force. It is arranged, therefore, that a substantial part of any force applied to the anchorage will be transferred to the adjacent door pillar 34. This is achieved by providing in the mounting 20 a strip 35 of mild steel, which is spot welded to the limb 26, and a right-angled bracket 36 of mild steel. One limb 37 of the bracket 36 is spot welded to the pillar 34 while the other limb 38 of that bracket extends into a socket, provided between the strip 35 and the limb 26, when the door is closed. This socket is constituted by appropriately shaping the strip 35 and is arranged to provide a snug fit for the limb 38.

The housing 18 (FIG. 2) also contains a locking mechanism which is capable of preventing further withdrawal of the strap 13 from the housing when the locking mechanism is subjected to an acceleration above a predetermined magnitude. To this end, the spring-loaded reel is mounted for rotation with a ratchet wheel 119 in the direction of an arrow 120 when the strap 13 is being withdrawn from the reel, and the teeth of the ratchet wheel 119 are engageable by a pivotally-mounted pawl 121 to inhibit such rotation of the wheel 119 and hence corresponding rotation of the spring-loaded reel. The pawl 121 is normally maintained out of engagement with the ratchet wheel 119 (in the position 121') and a deceleration sensor is provided within the housing 18 to urge the pawl 121 into engagement with the ratchet wheel 119 whenever the automobile is subjected to a deceleration in excess of the predetermined magnitude.

The deceleration sensor is shown in more detail in FIG. 3 and includes a weight 122 carried by a rod 129. The upper end of the rod 129 extends through a hole in a housing 130 of plastics and carries a part 131 which is captively mounted in a housing 130 and which has a curved lower surface to provide a pivotal mounting for the weight 122. The housing 130 also contains a disc 132 carrying a rod 133 that extends through a hole in the top of the housing 130 and engages at its free end a projection 127 (FIG. 2) on the pawl 121. The disc 132 and the rod 133 are provided by a moulding of plastics. The housing 130 is a snap fit in a plate 134 carried by the housing 18. When the automobile is subjected to a deceleration in excess of the predetermined magnitude, the resultant pivotal movement of the weight 122 causes the disc 132 to be moved by the part 131 in an upwards direction in the housing 130, it being arranged that the extent of such movement is sufficient to cause the pawl 121 to be moved by the rod 133 into the position 121" to inhibit rotation of the ratchet wheel 119.

It has been found that if the door is opened rapidly the weight 122 will initiate locking of the spring-loaded reel and accordingly it is proposed, in accordance with the present invention, to provide means to inhibit such locking of the reel when the door is open. To this end, a lever 123 (FIG. 2) is pivotally mounted in the housing 18 on a pivot pin 128. The free end of the lever 123 is coupled to the housing 18 by a tension spring 124. A plunger 125, pivotally mounted on the lever 123 adjacent its free end, is slidably mounted in a guide member 126 carried by the housing 18 and extends through the guide member and downwardly from the door 17 when open. In this position of the plunger 125, the lever 123 engages the projection 127 on the pawl 121 to maintain the pawl in the position 121' and thereby prevent operation of the locking mechanism by the weight 122. When the door 17 is closed the lower end of the plunger 125 engages a ramp 135 of nylon mounted on the door sill of the automobile and is gradually urged upwardly against the action of the spring 124 to cause the lever 123 to adopt the position 123'. In this position the lever 123 is disengaged from the projection 127 on the pawl 121 and the locking mechanism is thus free to act in the normal manner.

The position of the lever 123 may be controlled in accordance with the position of the automobile hand brake 50 (FIG. 1) rather than the door 17. In this arrangement, the plunger 125 is dispensed with and the hand brake 50 is coupled to the lever 123 through a cable linkage (not shown). When the hand brake 50 is released, the cable linkage is arranged to move the lever 123, against the action of the spring 124, into the position referenced 123' and thereby permit operation of the locking mechanism.

A parking hook 51 is provided on the automobile dashboard immediately in front of the seat 11, to provide a hook for the seat-belt whenever the hand brake 50 is applied. A mechanism is provided automatically to move the hook 51 when the hand brake 50 is released to cause the seat-belt to slide off the hook. When the hand brake 50 is applied the hook 51 may be manually returned to its original position to act as a parking hook for the seat-belt. Referring to FIGS. 6 and 7, the said mechanism is carried by a metal support 52 which is to be mounted behind the dashboard so that the hook 51 extends through an aperture 53 in the dashboard. The hook 51 is provided by a plastic-coated metal strip bent to the shape shown in FIG. 6 and welded along one edge to a metal plate 54. This plate 54 is welded to a sleeve 55 rotatably mounted on a rod 56; the rod being mounted at one end on a bracket 57 which is, in turn, mounted on the support 52. The rod 56 also carries a compression spring 58 which acts between a metal disc 59, mounted on the other end of the rod, and the sleeve 55. The hook 51 is shown in its parking position and is retained in that position by a plunger 60 which is slidably mounted in a sleeve 61 and which extends from one end of the sleeve to engage a rear edge 62 of the plate 54. The position of the plunger 60 within the sleeve 61 is controlled by a cable linkage coupling the hand-brake 50 to the sleeve and the plunger and, to this end, an outer sleeve 63 of the cable is secured to the other end of the sleeve 61 and an inner member 64 of the cable extends into the sleeve 61 and is secured to the plunger 60. The sleeve 61 is mounted on the bracket 57 by nuts 65 engaging a screw-threaded outer surface of the sleeve.

When the hand-brake 50 is released the inner member 64 of the cable is moved to the right in FIG. 7 to withdraw the plunger 60 into the sleeve 61 against the action of a tension spring 66 and thereby to disengage the plunger 60 from the plate 54. This permits movement of the plate 54 together with the hook 51 by a tension spring 67 into a position where the edge 62 of the plate 54 engages a stop 68 provided by the bracket 57.

Upon reapplication of the hand-brake 50, the hook 51 and the plate 54 may be manually returned to the position shown in FIGS. 6 and 7 whereupon the plunger 60 is urged by the spring 66 into the position shown in FIG. 7 to provide a stop for the plate 54.

We claim:

1. A seat-belt apparatus of the kind which is arranged to be mounted in a vehicle for automatically moving a seat-belt of the apparatus into, and away from, an operative position across a vehicle seat comprising,
   a seat-belt retraction mechanism mounted on a vehicle door adajcent said seat,
   means coupling said seat-belt to the retraction mechanism to permit withdrawal of the seat-belt from the retraction mechanism,
   said retraction mechanism including acceleration responsive means operable to inhibit withdrawal of the seat-belt from the retraction mechanism when said mechanism is subjected to an acceleration in excess of a predetermined magnitude and to permit such withdrawal at all other times,
   and means responsive to the position of said door for permitting said acceleration-responsive means to inhibit withdrawal of the seat-belt only when said door is closed and to prevent such inhibition whenever the door is open.

2. A seat-belt apparatus of the kind which is arranged to be mounted in a vehicle for automatically moving a seat-belt of the apparatus into, and away from, an operative position across a vehicle seat comprising,
   a seat-belt retraction mechanism mounted on a vehicle door adjacent said seat,
   means coupling said seat-belt to the retraction mechanism to permit withdrawal of the seat-belt from the retraction mechanism, the retraction mechanism including a locking mechanism for inhibiting withdrawal of the seat-belt from the retraction mechanism when the retraction mechanism is subjected to an acceleration in excess of a predetermined magnitude,
   and means for controlling operation of the locking mechanism in accordance with the position of said door to prevent operation of the locking mechanism whenever the door is open and to permit operation of the locking mechanism whenever the door is closed, said locking mechanism including means for permitting withdrawal of the seat-belt from the retraction mechanism at all times when the vehicle door is closed except when the retraction mechanism is subjected to said predetermined acceleration.

3. A seat-belt apparatus according to claim 2, including a support which is to be disposed at a location forwardly of the said seat and means for releasing the seat-belt from the support whenever attempts are made to set the vehicle in motion.

4. A seat-belt apparatus according to claim 2, wherein the locking mechanism includes an actuating arm, and wherein the said means for controlling operation of the locking mechanism includes an element movable between a first position in which it engages the said actuating arm to inhibit operating of the locking mechanism and a second position in which it is disengaged from the said actuating arm to permit operation of the locking mechanism, resilient means coupled to the said element to urge that element into its said first position, and means which is arranged to move the said element against the action of the resilient means into the said second position.

5. A seat-belt apparatus according to claim 4, wherein the said means for moving the said element comprises an elongate member coupled to the said element which is to be slidably mounted on the said door, and a device which is to be mounted on a fixed structure of the vehicle and which is to engage the elongate member whenever the door is closed to move the said element into its said second position.

6. A seat-belt apparatus for a vehicle seat comprising:
   a seat-belt retraction mechanism which is to be mounted on a vehicle door adjacent said seat,
   means coupling said seat-belt to the retraction mechanism to permit withdrawal of the seat-belt from the retraction mechanism,
   inertia-responsive means for inhibiting withdrawal of the seat-belt from the retraction mechanism whenever the inertia-responsive means is subjected to an acceleration in excess of a predetermined magnitude,
   means to mount said inertia-responsive means on said vehicle door,
   and means for responding to the position of said vehicle door to permit operation of said inertia-responsive means only when the vehicle door is closed, said inertia-responsive means including mens for permitting withdrawal of the seat-belt from the retraction mechanism at all times when said vehicle door is closed except when said inertia-responsive means is subjected to said predetermined acceleration.

7. Vehicle seat-belt apparatus of the kind which is mounted in a vehicle so as to automatically move the seat-belt into, and away from, an operative position across a vehicle seat comprising:
   a seat-belt retraction mechanism mounted on a vehicle door adjacent said seat, means coupling said seat-belt to the retraction mechanism to permit withdrawal of the seat-belt from the retraction mechanism, said retraction mechanism including a locking mechanism for inhibiting withdrawal of the seat-belt from the retraction mechanism whenever the retraction mechanism is subjected to an acceleration in excess of a predetermined magnitude, and means for controlling operation of the locking mechanism in accordance with the position of said door to prevent operation of the locking mechanism whenever the door is open and to permit operation of the locking mechanism whenever the door is closed, said locking mechanism including means for permitting withdrawal of the seat-belt from the retraction mechanism at all times when the vehicle door is closed except when the retraction mechanism is subjected to said predetermined acceleration.

8. A seat-belt apparatus of the kind which is arranged to be mounted in a vehicle for automatically moving a seat-belt of the apparatus into, and away from, an operative position across a vehicle seat comprising, a seat-belt retraction mechanism mounted on a vehicle door adjacent said seat, means coupling said seat-belt to the retraction mechanism to permit withdrawal of the seat-belt from the retraction mechanism, the retraction mechanism including a locking mechanism for inhibiting withdrawal of the seat-belt from the retraction mechanism when the retraction mechanism is subjected to an acceleration in excess of a predetermined magnitude, means for controlling operation of the locking mechanism in accordance with the position of said door to prevent operation of the locking mechanism whenever the door is open and to permit operation of the locking mechanism whenever the door is closed, said locking mechanism including means for permitting withdrawal of the seat-belt from the retraction mechanism at all times when the vehicle door is closed except when the retraction mechanism is subjected to said predetermined acceleration, a support mounted on said door adjacent a rear edge of the door, the support defining a guideway which is to extend in a substantially vertical direction in the vehicle, an anchorage which is to be slidably mounted in the guideway and includes means in which the seat-belt is to be slidably mounted, and means for adjusting the position of the anchorage along the guideway.

* * * * *

REEXAMINATION CERTIFICATE (716th)
United States Patent [19]

Giffen et al.

[11] B1 4,040,645
[45] Certificate Issued Jul. 7, 1987

[54] SEAT-BELT APPARATUS

[75] Inventors: William M. Giffen, Hailey, England; John M. Pollitt, Gretna, Scotland; Roy Clifford, Carlisle, England

[73] Assignee: Auto Restraint Systems Limited, London, England

Reexamination Request:
No. 90/000,600, Aug. 3, 1984

Reexamination Certificate for:
Patent No.: 4,040,645
Issued: Aug. 9, 1977
Appl. No.: 585,426
Filed: Jun. 9, 1975

[30] Foreign Application Priority Data

Jun. 10, 1974 [GB] United Kingdom ............... 25703/74

[51] Int. Cl.$^4$ ............................................. B60R 21/10
[52] U.S. Cl. ............................... 280/803; 242/107.4 A
[58] Field of Search ...................... 280/801, 803, 806; 297/474–476, 479, 480; 242/107.4 A

[56] References Cited

U.S. PATENT DOCUMENTS

| | | | |
|---|---|---|---|
| 3,508,720 | 4/1970 | Kell | 242/107.4 A |
| 3,722,824 | 3/1973 | Hayashi | 414/713 |
| 3,831,702 | 8/1974 | Kaneko et al. | 180/82 C |
| 3,838,831 | 10/1974 | Bell | 242/107.4 A |
| 3,866,944 | 2/1975 | Takahashi | 280/803 |
| 3,917,019 | 11/1975 | Pearson et al. | 180/82 C |
| 3,964,798 | 6/1976 | Burleigh | 303/1 A |

FOREIGN PATENT DOCUMENTS

| | | |
|---|---|---|
| 2344287 | 3/1975 | Fed. Rep. of Germany . |
| 2412253 | 9/1975 | Fed. Rep. of Germany . |
| 1367248 | 9/1974 | United Kingdom . |

*Primary Examiner*—Richard A. Bertsch

[57] ABSTRACT

A seat-belt apparatus of the kind which is arranged to be mounted in a vehicle for automatically moving a seat-belt of the apparatus into, and away from, an operative position across a vehicle seat. A seat-belt retraction mechanism is coupled to the seat-belt and is mounted on a vehicle door adjacent the said seat. The retraction mechanism includes a locking mechanism for inhibiting withdrawal of the seat-belt from the retraction mechanism, and is provided with means for controlling operation of the locking mechanism having a first state in which operation of the locking mechanism is inhibited and a second state in which operation of the locking mechanism is permitted. The means for controlling operation of the locking mechanism may be arranged to inhibit operation of the locking mechanism at least when the door is being opened and to permit operation of the locking mechanism at least when the vehicle is in motion, and, in these circumstances, the means for controlling operation of the locking mechanism may include means responsive to the position of the door to inhibit operation of the locking mechanism whenever the door is open and to permit operation of the locking mechanism whenever the door is closed.

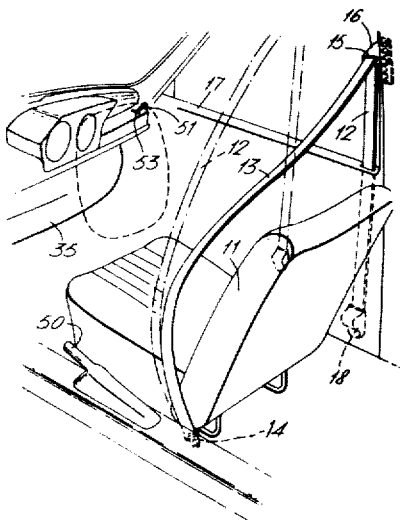

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-5, 7 and 8 is confirmed.

Claim 6 is determined to be patentable as amended.

New claims 9-13 are added and determined to be patentable.

6. A seat-belt apparatus for a vehicle seat comprising:
a seat-belt retraction mechanism which is to be mounted on a vehicle door adjacent said seat,
means coupling said seat-belt to the retraction mechanism to permit withdrawal of the seat-belt from the retraction mechanism,
inertia-responsive means for inhibiting withdrawal of the seat-belt from the retraction mechanism whenever the inertia-responsive means is subjected to an acceleration in excess of a predetermined magnitude,
means to mount said inertia-responsive means on said vehicle door,
and means for responding to the position of said vehicle door to permit operation of said inertia-responsive means only when the vehicle door is closed, said inertia-responsive means including [mens] *means* for permitting withdrawal of the seat-belt from the retraction mechanism at all times when said vehicle door is closed except when said inertia-responsive means is subjected to said predetermined acceleration.

9. *A vehicle incorporating therein the seat-belt apparatus of claim 1, wherein said retraction mechanism is mounted on said door adjacent the lower rear corner thereof and wherein an upper anchorage is mounted on said door adjacent said rear edge thereof above said retraction mechanism, said upper anchorage having means providing a slot through which said seat belt extends from said retraction mechanism.*

10. *A vehicle according to claim 9, wherein said upper anchorage is adjustable as regards the height of said slot providing means.*

11. *A vehicle incorporating therein the seat-belt apparatus of claim 1 wherein said vehicle door overlies a door sill in the closed position thereof, and wherein said means responsive to said door position comprises a plunger, spring means biasing said plunger to project outwardly beyond the lower edge of said door and a ramp on said sill engaged by said plunger when said door is closed to urge said plunger upwardly into said door against said spring biasing means.*

12. *A seat belt apparatus according to claim 3, mounted in a vehicle having a handbrake, said means for releasing the seat belt from the support being operative in response to release of said handbrake.*

13. *A seat belt apparatus of the kind specified comprising:*
*a seat belt retractor device, and*
*means for mounting said retractor device in a vehicle door adjacent said seat*
*said retractor device having belt storage means from which the seat belt can be withdrawn, an acceleration sensitive locking device adapted to lock said retractor against belt withdrawal when subjected to an acceleration in excess of a predetermined magnitude, said locking device comprising a pendulum mounted to pivot in response to a predetermined acceleration, and an output member pivotable by the pendulum on said pivoting thereof to effect locking of the retractor, and inhibitor means operative to inhibit said locking of said retractor device when said door is in an open position, said inhibitor means comprising a lever pivotable to overlie said pivotable output member to prevent locking movement thereof when said door is in said open position.*

* * * * *